(31.)
AARON GREGG.
Improvement in mode of Attaching Sleigh Runners to Vehicles.
No. 122,454.                            Patented Jan. 2, 1872.
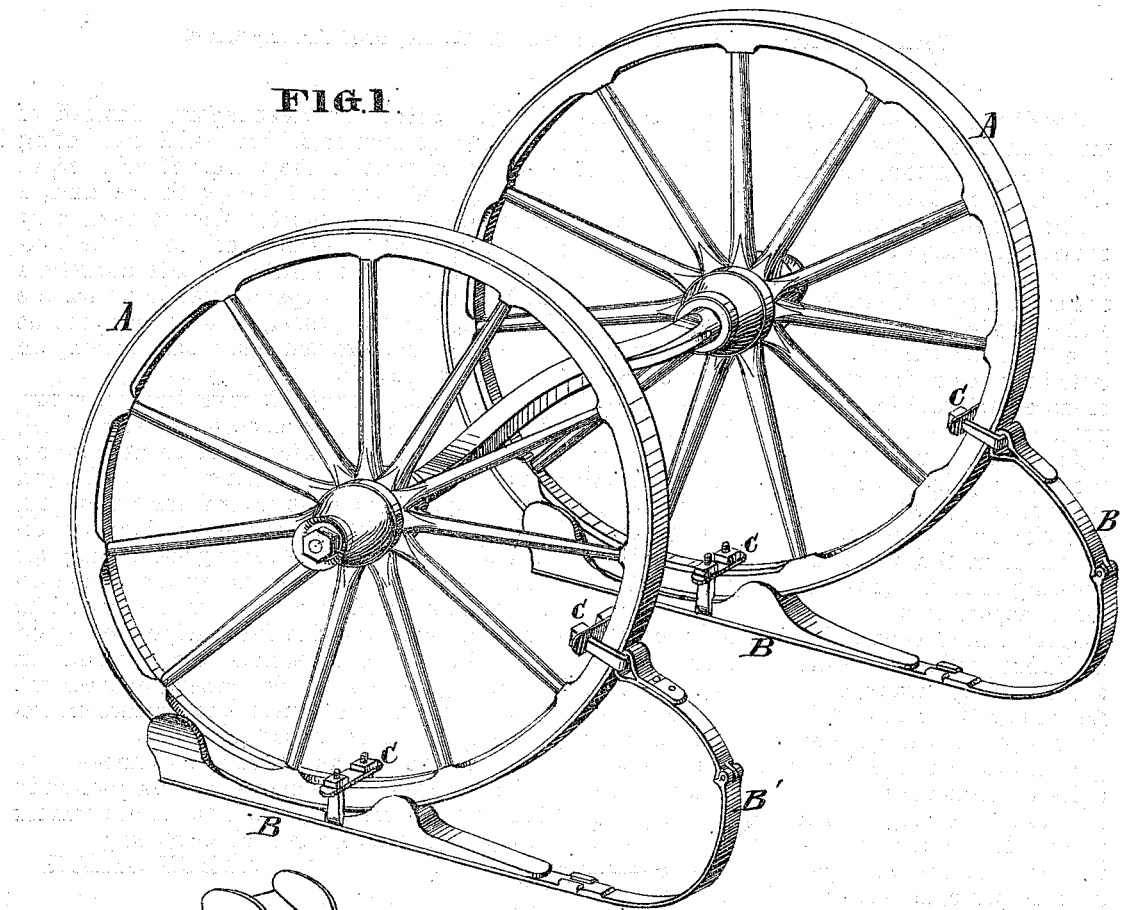
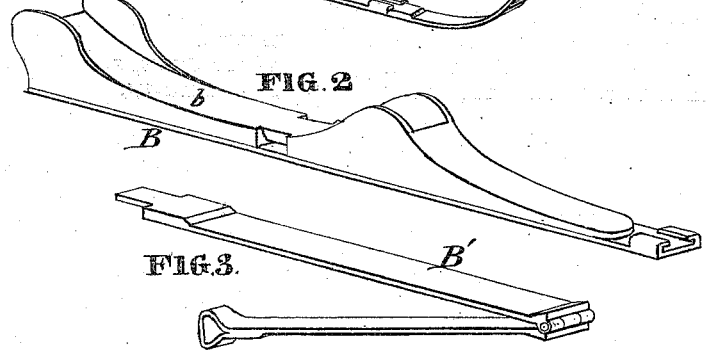
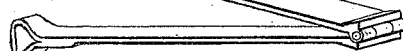
ATTEST.                                    INVENTOR.

122,454

UNITED STATES PATENT OFFICE.

AARON GREGG, OF ANDERSON, INDIANA.

IMPROVEMENT IN MODES OF ATTACHING SLEIGH-RUNNERS TO VEHICLES.

Specification forming part of Letters Patent No. 122,454, dated January 2, 1872.

Specification describing certain Improvements in Snow-Shoes for Vehicles, invented by AARON GREGG, of Anderson, county of Madison, and State of Indiana.

The subject of my invention is a snow-shoe or sleigh-runner, which is applied to each wheel of a vehicle to adapt it to be drawn as a sleigh, the same being separate to facilitate turning and extended in front of the wheel so as to act as a "chock." The invention principally consists in making the snow-shoes in two, three, or more parts and jointing or connecting these parts together, as hereinafter set forth.

In the drawing, Figure 1 is a perspective view of a pair of wheels with my improved snow-shoe applied. Figs. 2 and 3 are perspective views of the two parts of the shoe, disconnected from the wheel and from each other, showing the manner in which they are packed for transportation.

A A are the wheels of the vehicle, to the lower and front part of which are attached the snow-shoes B B, by means of clips or other suitable fastenings C. The part $b$ of the shoes, which is next to the wheel, is curved at the same angle with the wheel and provided on each side, at its front and back ends, with flanges or cleats $b'$ to aid in holding the shoe more firmly in its place. My invention consists in making the runner $B'$ of this snow-shoe B in two, three, or more parts, as shown, and jointing or connecting the parts together by any suitable means—but I prefer that shown, as the most simple—to adapt them to be readily and easily folded together or taken apart. Instead of making the runner $B'$ long and connecting their front ends to the wheels of vehicles, at or above a horizontal line with the axle, I make them much shorter than is customary and attach them to the wheel below the horizontal line from the axle and extend them a little beyond the perpendicular line from the periphery of the wheel, so that they act as "chocks" and prevent the wheel turning in that direction.

The advantages of this invention are many. By having a separate shoe upon each wheel, great facility for making short turns is given, and jolting prevented; being short and light, are cheap, and, being in several parts or hinged, may be packed in a small case or folded together and carried under a carriage-seat ready for use at any time, thus enabling travelers during winter to carry with them the means to convert their vehicles into sleighs, or again into wheeled vehicles, in a few moments, an advantage which will be properly appreciated in certain latitudes where snow comes on frequently and goes off suddenly.

I claim as new and of my invention—

The snow-shoes constructed and jointed in the manner herein described to adapt them for ready adjustment, removal, or stowage.

AARON GREGG.

Witnesses:
W. SAUNDERS,
H. J. BROWN.

(31)